US008021592B2

(12) United States Patent
Ward et al.

(10) Patent No.: US 8,021,592 B2
(45) Date of Patent: Sep. 20, 2011

(54) PROCESS FOR FABRICATING POLYPROPYLENE SHEET

(75) Inventors: Ian M Ward, Leeds (GB); Peter J Hine, Leeds (GB)

(73) Assignee: Propex Operating Company LLC, Chattanooga, TN (US)

(*) Notice: Subject to any disclaimer, the term of this patent is extended or adjusted under 35 U.S.C. 154(b) by 591 days.

(21) Appl. No.: 11/790,142

(22) Filed: Apr. 24, 2007

(65) Prior Publication Data
US 2007/0196634 A1 Aug. 23, 2007

Related U.S. Application Data

(63) Continuation of application No. 10/496,500, filed as application No. PCT/GB02/04562 on Oct. 8, 2002.

(30) Foreign Application Priority Data

Nov. 27, 2001 (GB) .................................. 0128405.8

(51) Int. Cl.
D21J 3/00 (2006.01)
B29C 59/02 (2006.01)
B29C 51/14 (2006.01)
B29C 71/00 (2006.01)

(52) U.S. Cl. ........ 264/324; 264/40.6; 264/112; 264/234; 264/237; 264/258; 264/320; 264/322; 264/325; 264/345; 264/348

(58) Field of Classification Search ........................ None
See application file for complete search history.

(56) References Cited

U.S. PATENT DOCUMENTS

| 3,231,650 A * | 1/1966 | Findlay et al. ................. 264/128 |
| 3,367,926 A * | 2/1968 | Voeks ............................. 524/84 |
| 3,689,597 A | 9/1972 | Mahlman |
| 3,884,521 A | 5/1975 | Moore |
| 3,947,537 A * | 3/1976 | Buntin et al. ................. 264/137 |
| 3,962,205 A | 6/1976 | Ward et al. |
| 3,997,386 A | 12/1976 | Oshida et al. |
| 4,013,816 A | 3/1977 | Sabee et al. |
| 4,048,364 A | 9/1977 | Harding et al. |
| 4,082,731 A | 4/1978 | Knopka |
| 4,091,140 A | 5/1978 | Harmon |
| 4,110,391 A | 8/1978 | Berzen et al. |
| 4,136,715 A | 1/1979 | McCormack et al. |
| 4,191,718 A | 3/1980 | Mallick et al. |
| 4,228,118 A | 10/1980 | Wu et al. |
| 4,234,536 A | 11/1980 | Thiel et al. .................... 264/522 |
| 4,285,748 A | 8/1981 | Booker et al. |
| 4,287,149 A | 9/1981 | Capaccio et al. ........... 264/210.7 |
| 4,384,016 A | 5/1983 | Ide et al. |
| 4,403,012 A | 9/1983 | Harpell et al. |
| 4,413,110 A | 11/1983 | Kavesh et al. |
| 4,455,273 A | 6/1984 | Harpell et al. |
| 4,483,727 A | 11/1984 | Eickman et al. |
| 4,525,564 A | 6/1985 | Capaccio et al. ........... 526/348.1 |
| 4,551,296 A | 11/1985 | Kavesh et al. |
| 4,568,581 A | 2/1986 | Peoples, Jr. |
| 4,642,153 A | 2/1987 | Lohr |
| 4,647,640 A | 3/1987 | Capaccio et al. ........... 526/348.1 |
| 4,668,577 A | 5/1987 | Ohta et al. |
| 4,786,348 A | 11/1988 | Luise |
| 4,792,426 A * | 12/1988 | Greatorex et al. ............. 264/284 |
| 4,923,660 A | 5/1990 | Willenberg et al. |
| 4,931,230 A | 6/1990 | Krueger et al. |
| 4,938,913 A | 7/1990 | Ward et al. |
| 4,948,661 A | 8/1990 | Smith et al. |
| 4,990,204 A | 2/1991 | Krupp et al. |
| 5,006,390 A | 4/1991 | Kavesh et al. |
| 5,032,339 A | 7/1991 | Farraye-Callahan et al. . 264/235 |
| 5,035,952 A | 7/1991 | Bruinink et al. |
| 5,135,804 A | 8/1992 | Harpell et al. |
| 5,200,131 A * | 4/1993 | Asanuma et al. ............. 264/232 |
| 5,244,482 A | 9/1993 | Hassenboehler, Jr. et al. |
| 5,324,576 A | 6/1994 | Reed et al. |
| 5,340,633 A | 8/1994 | van der Loo et al. |
| 5,498,129 A | 3/1996 | Dequin et al. |
| 5,514,448 A | 5/1996 | Kishi et al. |
| 5,628,946 A | 5/1997 | Ward et al. |
| 5,688,426 A | 11/1997 | Kirkwood et al. |
| 5,766,725 A | 6/1998 | Hoogenboom et al. |
| 5,879,607 A * | 3/1999 | Klocek et al. ................. 264/231 |
| 6,017,834 A | 1/2000 | Ward et al. |

(Continued)

FOREIGN PATENT DOCUMENTS

EP 0 116 845 8/1984

(Continued)

OTHER PUBLICATIONS

Hine et al., Plastics and Rubber Composites Processing and Applications, vol. 27, 1998, pp. 167-171.*
Chisso, K.K., et al.; Laid Open Patent Publication No. 52-37875 (1977).
Japanese Patent Public Disclosure No. 2-229253 (1990).
Toyobo Co. Ltd., Laid Open Patent Publication No. 2-229253 (1990).
Yan, R.J., et al; "The hot compaction of SPECTRA gel-spun polyethylene fibre"; Journal of Materials Science; vol. 32, pp. 4821-4831 (1977).
Kabeel, M.A., et al; "Compaction of high-modulus melt-spun polyethylene fibres at temperatures above and below the optimum"; Journal of Materials Science, vol. 29; pp. 4594-4699 (1994).
Gao, P., et al; "Effects of compaction pressure on cohesive strength and chain mobility of low-temperature compacted nascent UHMWPE"; Polymer, vol. 37, No. 15; pp. 3265-3272 (1996).
Jones, R.A., et al; "Radiation-Induced Crosslinking of Polyethylene in the Presence of Acetylene: A Gel Fraction, UV-Visible, and ESR Spectroscopy Study"; Journal of Polymer Science; vol. 31, pp. 807-819 (1993).

(Continued)

Primary Examiner — Jeffrey Wollschlager
(74) Attorney, Agent, or Firm — Husch Blackwell LLP

(57) ABSTRACT

A process of production of a monolithic article from a web of fibres of oriented polypropylene polymer, comprising the steps of subjecting the web to elevated temperature and pressure sufficient to melt a proportion of the polymer and compact it, and then cooling the compacted web, wherein an accelerated rate of cooling is employed down to 100° C. The process is of particular benefit when the weight average molecular weight ($M_w$) of the fibers is 250,000 or below. The resultant articles have good stiffness and strength, yet with reasonable ductility. Similar articles cooled slowly are brittle.

6 Claims, 1 Drawing Sheet

U.S. PATENT DOCUMENTS

Figure 1:
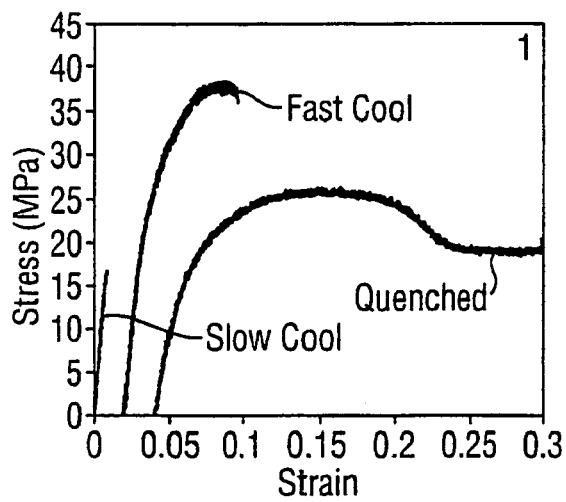
Figure 1:
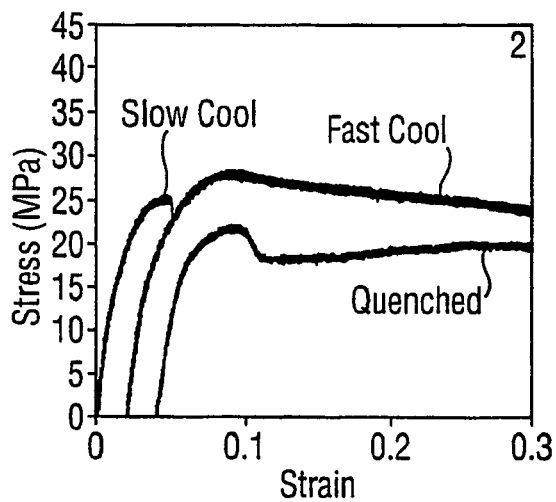
Figure 1:
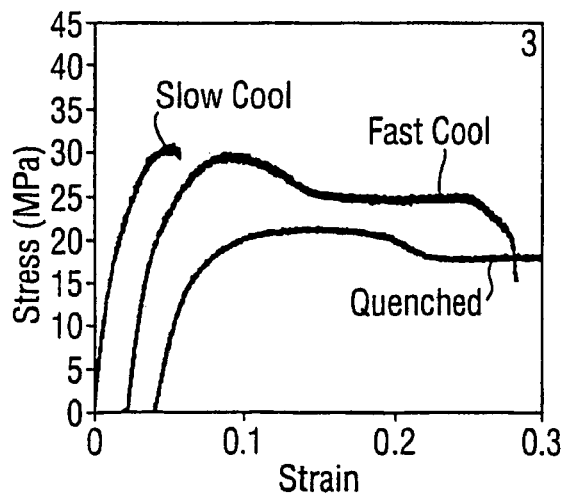
Figure 1:
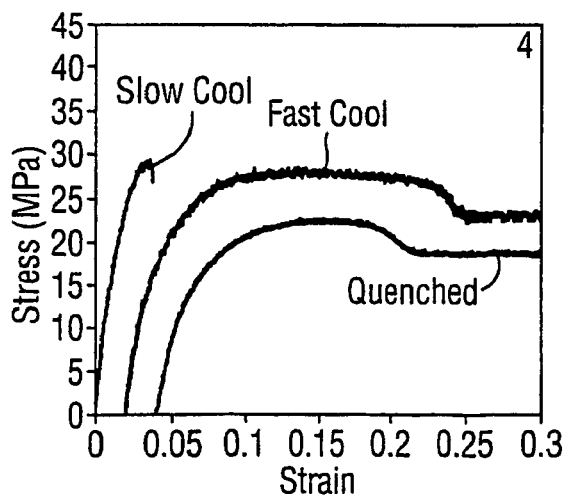

| | | | |
|---|---|---|---|
| 6,132,657 A | 10/2000 | Cohen et al. | |
| 6,183,834 B1 | 2/2001 | van der Loo | |
| 6,238,768 B1 | 5/2001 | Van de Goot | |
| 6,277,773 B1 | 8/2001 | Ward et al. | 442/409 |
| 6,312,638 B1 | 11/2001 | Ward et al. | 264/322 |
| 6,328,923 B1 | 12/2001 | Jones et al. | 264/494 |
| 6,458,727 B1 | 10/2002 | Jones et al. | 442/409 |
| 6,482,343 B1 | 11/2002 | Cohen et al. | 264/120 |
| 2002/0001693 A1 | 1/2002 | Mokveld et al. | |
| 2002/0016121 A1 | 2/2002 | Bjekovic et al. | |
| 2004/0169304 A1 | 9/2004 | Ward et al. | 264/122 |
| 2004/0185732 A1 | 9/2004 | Bonner et al. | 442/185 |
| 2004/0213977 A1 | 10/2004 | Ward et al. | 428/292.1 |
| 2005/0170730 A1 | 8/2005 | Ward et al. | 442/365 |

FOREIGN PATENT DOCUMENTS

| | | |
|---|---|---|
| EP | 0 201 029 | 11/1986 |
| EP | 0385543 | 9/1990 |
| EP | 0 391 686 A2 | 10/1990 |
| EP | 0417827 | 3/1991 |
| EP | 0 580 423 A1 | 3/1994 |
| EP | 0604838 | 7/1994 |
| EP | 768507 | 4/1997 |
| GB | 2 151 238 A | 7/1985 |
| GB | 2 253 420 | 9/1992 |
| GB | 2253420 | 9/1992 |
| JP | 4-62192 | 12/1971 |
| JP | SHO 51-12870 | 1/1976 |
| JP | 5-237875 | 3/1977 |
| JP | SHO 52-37875 | 3/1977 |
| JP | 59-163458 | 9/1984 |
| JP | 61-255831 | 11/1986 |
| JP | HEI 02-61156 | 3/1990 |
| JP | H6-87185 A | 3/1994 |
| JP | HEI 7-90762 | 4/1995 |
| JP | 07-299891 | 11/1995 |
| JP | H7-299891 A | 11/1995 |
| WO | WO 88/09406 | 12/1988 |
| WO | WO 88/09604 | 12/1988 |
| WO | WO9320271 | 10/1993 |
| WO | WO9700766 | 1/1997 |
| WO | WO 97/26025 | 7/1997 |
| WO | WO 98/15397 A2 | 4/1998 |
| WO | WO 98/15397 A3 | 4/1998 |
| WO | WO 98/15398 | 4/1998 |
| WO | WO02/090082 | 11/2002 |
| WO | WO03/045659 | 6/2003 |
| WO | WO2004/039565 | 5/2004 |
| WO | WO2005065910 | 7/2005 |
| WO | WO2005066577 | 7/2005 |

OTHER PUBLICATIONS

Kabeel, M.A., et al; "Differential melting in compacted high-modulus melt-spun polyethylene fibres"; *Journal of Materials Science*; vol. 30, pp. 601-606 (1995).

Rasburn, J., et al; "The hot compaction of polyethylene terephthalate"; *Journal of Materials Science*, vol. 30, pp. 615-622 (1995).

Office Action in related U.S. Appl. No. 10/496,500, dated Jan. 19, 2010.

Amendment filed Nov. 11, 2009 in related U.S. Appl. No. 10/496,500.

Marais et al., in *Composites Science and Technology*, 45, 1992, pp. 247-255.

Ogawa et al., in *Journal of Applied Polymer Science*, 68, 1998, pp. 1431-1439.

European Examination report in EP02803855.2, Nov. 5, 2005.

European Examination report in EP02765109.0, Nov. 15, 2005.

Y. Sakata et al., The Structure and Mechanical Properties of Syndiotactic Polypropylene, J. Mater. Sci., 30 (1995), 5841-5849, USA.

J. B. P. Soares, T. McKenna, and C. P. Cheng in Polymer Reaction Engineering, J. M. Asua, Ed., Blackwell Publishing Ltd., Oxf, (See Chapter 2 "Coordination Polymerization").

\* cited by examiner

PROCESS FOR FABRICATING POLYPROPYLENE SHEET

This application is a continuation of application Ser. No. 10/496,500, filed Jul. 14, 2004, which is a 371 of PCT/GB02/04562, filed Oct. 8, 2002, the entire content of which is hereby incorporated by reference in this application.

The present invention relates to polymer sheet materials made from oriented olefin polymer fibres or tapes, and in particular an improved process for making such materials.

In recent years, developments have been made in processes for compacting polyolefin fibres in order to make sheets of high stiffness and strength. Two-step compaction processes for melt-spun fibres employing high compaction pressures are well known. An example is disclosed in GB 2253420A, in which an assembly of fibres of an oriented polymer is hot compacted in a two-step process to form a sheet having good mechanical properties. The process involves an initial step in which the fibres are brought to and held at the compaction temperature whilst subject to a pressure sufficient to maintain the fibres in contact, and thereafter compacted at a high pressure (40-50 MPa) for a few seconds (the compaction pressure). In this process a proportion of the fibre surfaces, generally from 5 to 10 percent by weight, melt and subsequently recrystallise on cooling. This recrystallise phase binds the fibres together, resulting in good mechanical properties of the final sheet.

It is mentioned in GB 2253420A that the process can be applied to many types of oriented polymer including polyester and PEEK (polyether ether ketone) but that preferred polymers are oriented polyolefins. Polyethylene is the only polyolefin mentioned, and is used in all of the examples.

In WO 98/15397, an improvement to the above process is disclosed in which an assembly of melt-formed polyolefin fibres is maintained in intimate contact at elevated temperature sufficient to melt a proportion of the fibres, whilst being subjected to a compaction pressure of no greater than 10 MPa. This single-step, low-pressure process also produces products having excellent mechanical properties. If wished the fibres may have been subjected to a prior crosslinking process, preferably an irradiation crosslinking process comprising irradiating the fibres with an ionising radiation in an inert environment containing alkylene or diene compounds, and then an annealing step comprising annealing the irradiated polymer at an elevated temperature, again in an inert environment containing alkyne or diene compounds.

In GB 2253420A it is stated that "the hot compacted materials are preferably cooled to ambient temperature under controlled conditions. Rapid cooling is less preferred. The most convenient technique is to allow the compacts to stand in the air until they have cooled to ambient temperature." The examples of GB 2253420A do not mention cooling rate.

In the examples of WO 98/15397 the compaction temperature and pressure were applied and the assembly was cooled under the compaction pressure to 100° C. by passing a mixture of air and water through the heating platens. At this point the assembly was removed from the press and cooled to room temperature in air with no pressure applied. Cooling rate is not mentioned.

In Plastics, Rubber and Composites Processing and Applications, 1998, Vol 27, No. 4, pgs 167-171, specifically in relation to polyethylene it was stated that "the final cooling rate does not significantly affect the structure or properties of the final compacted sheet: quenched samples have been measured to have almost identical properties to slow cooled samples."

Despite the above, we now have evidence to suggest that the cooling rate can have a significant effect on the final properties of compacted articles formed from fibres of oriented homopolymer or copolymer material.

In particular, we have discovered that unlike polyethylene, in the case of polypropylene the cooling rate has a significant effect on the final properties of the compacted sheet. Specifically, faster cooling rates result in the improvement of some properties, in particular ductility, and related properties such as peel strength.

Accordingly, the present invention provides a process for production of a monolithic article from a web of fibres of oriented polypropylene homopolymer or copolymer, comprising the steps of subjecting the web to elevated temperature and pressure sufficient to melt a proportion of the polymer and compact it, and then cooling the compacted web, wherein an accelerated rate of cooling is employed down to a lower temperature and in which said lower temperature is a predetermined amount below the recrystallisation temperature of the fibres.

In a particular aspect, the present invention provides a process for production of a monolithic article from a web of fibres of oriented polypropylene homopolymer or copolymer, comprising the steps of subjecting the web to elevated temperature and pressure sufficient to melt a proportion of the polymer and compact it, and then cooling the compacted web, wherein an accelerated rate of cooling is employed down to 100° C.

The fibres can be made by any suitable process, for example by solution or gel or melt forming, but most preferably by melt forming.

The term "fibres of oriented polypropylene homopolymer or copolymer" is used herein to denote all elongate elements which comprise polypropylene. They may be in the form of strands or filaments. They may be in the form of bands, ribbons or tapes, formed for example by initially slitting melt formed films. Whatever their form the fibres may be laid in a non-woven web for the process of the invention. Alternatively they may be formed into yarns comprising multiple fibres, or used in the form of a monofilament yarn. The fibres are usually formed into a fabric by weaving or knitting. Optionally the fibres may have been subjected to a crosslinking process, as described in WO 98/15397. Woven fabrics may comprise only fibres in the form of strands or filaments, or they may comprise a mixture of fibres in the form of strands or filaments and fibres in the form of tapes. Most preferred are fabrics which are woven from flat tapes, as these have the best mechanical properties.

"An accelerated rate of cooling" in this specification means cooling under conditions such that heat is lost from the monolithic article more quickly than if it were cooled from the elevated temperature to a predetermined lower temperature below the recrystallisation temperature for the material, under ambient conditions, that is, in still air at ambient temperature, typically 20° C. That is, the monolithic article reaches the lower temperature more quickly than it would under ambient conditions. Cooling is not necessarily accelerated throughout the temperature range from the elevated temperature to the lower temperature. Suitably, however, an accelerated rate of cooling may be applied throughout the range from the elevated temperature down to the lower temperature.

The actual lower temperature is selected depending upon the recrystallisation temperature of the material being treated and should be one sufficiently below the recrystallisation temperature to ensure the material is prevented from recrystallising once the lower temperature has been reached. This may be achieved with a lower temperature as little as 10° C. below the recrystallisation temperature when one employs temperature stabilisation techniques. However it will be appreciated that a greater temperature differential such as between 10° C. and 20° C. or between 10° C. and 40° C. or indeed greater may be employed to good effect. In the particular example discussed later herein the lower temperature for polypropylene was selected to be 100° C.

An accelerated rate of cooling may in principle be achieved by one or more of the following means:
- contacting the compacted web with a fluid which is below ambient temperature
- contacting the compacted web with a fluid which is a better thermal conductor than air at ambient temperature
- providing for relative movement between the compacted web and a fluid; most practicably, by impelling the fluid over the compacted web.

The rate at which the compacted web is cooled is preferably at least 10° C. per minute, preferably at least 30° C. per minute, still more preferably at least 50° C. per minute. Particularly preferred is extremely rapid cooling of at least 100° C. per minute, preferably at least 200° C. per minute, and in the case of thin sheets in excess of 500° C. per minute. These are average values applying to the entire cooling phase, from the elevated temperature to 100° C. Very rapid rates of cooling may be termed quenching and may, indeed, be achieved by the traditional quenching method long used in the metallurgical art, of immersing the respective article in water.

The accelerated rate of cooling of the compacted web in accordance with the present invention only applies down to 100° C., which is significantly below the recrystallisation temperature.

It is preferred that the hot compaction process of the invention uses a compaction pressure not exceeding 10 MPa. It is also preferred that a single pressure is used throughout the hot compaction process. Most preferred pressures are between 1 and 7 MPa, particularly between 2 and 5 MPa. It is preferred that the hot compaction pressure is maintained during cooling.

The minimum temperature at which the fibres should be contacted is preferably that at which the leading edge of the endotherm, measured by Differential Scanning Calorimetry (DSC), of the constrained polymer fibres extrapolated to zero intersects the temperature axis. Preferably, the temperature at which the fibres are compacted is no greater than the constrained peak temperature of melting at the ambient compaction pressure—i.e. the temperature of which the endotherm reaches it highest point. The proportion of the fibres which is melted during the hot compaction process is generally between 10 and 50 percent by weight.

Preferably the fibres used in the present invention have a weight average molecular weight ($M_w$) in the range 100,000 to 800,000. In certain embodiments $M_w$ is in the range 250,000 to 450,000, for example 330,000 to 400,000. In certain other embodiments $M_w$ is in the range 100,000 to 250,000, for example 150,000 to 220,000; $M_w$ being determined by the method described hereinafter. With such materials of lower $M_w$ the present invention provides a route to high yield stress and Young's modulus, yet should show a yield point rather than brittle failure.

The polymer is preferably a polypropylene homopolymer, but may be a copolymer comprising polypropylene. Generally any copolymer containing polypropylene such as those disclosed in WO 98/15397 may be used.

Compaction of the polypropylene may be carried out in an autoclave, or in a belt press or other apparatus in which the assembly is fed through a compaction zone where it is subjected to the required elevated temperature and pressure. Thus, the process may be operated as a continuous or semi-continuous process. Cooling is preferably effected whilst the sheet is restrained against dimensional change, for example by being held under tension or by being still under a compaction pressure. In the case of a belt press for example, the belt itself may be cooled (for example using air chilled by ice water) in the region immediately after the heating zone. In this way, it is possible to achieve cooling rates of up to 500° C. per minute.

The monolithic article may be regarded as a polypropylene composite made up of a polypropylene matrix phase which was produced during the process, and a polypropylene fibre phase, a proportion of which may show selective surface melting, arising from the process. The properties of both the matrix phase and the fibre phase are of significance in achieving a monolithic article of the required properties, and they may be defined, and studied, separately.

Preferably the Young's modulus of the matrix phase is at least 0.9 GPa, more preferably at least 1.2 GPa, more preferably at least 1.5 GPa, and most preferably at least 1.8 GPa.

Preferably the failure strength of the matrix phase is at least 20 MPa, more preferably at least 25 MPa, and most preferably at least 35 MPa.

Preferably the failure strain of the matrix phase is at least 5%.

Preferably the Young's modulus in the longitudinal direction (which may alternatively be called the draw or axial direction) of the fibre phase is at least 4 GPa, more preferably at least 6 GPa, and most preferably at least 8 GPa.

Preferably the failure strength in the longitudinal direction of the fibre phase is at least 250 MPa, more preferably at least 350 MPa, and most preferably at least 420 MPa.

Preferably the failure strain in the longitudinal direction of the fibre phase is at least 5%.

EXAMPLE SET A

The effect of cooling rate was established by examining the cooling of a completely melted fabric, to simulate the melted matrix phase in a hot compacted sheet. It has been found that the properties of a hot compacted sheet are a combination of the properties of the original oriented fibres (the reinforcing phase), and the portion of the fibres which are melted (the matrix phase). Therefore by examining the properties of a melted fabric which has been cooled at different rates, it is possible to simulate the effect of cooling a hot compaction sheet at different rates.

The fabrics used were made from a number of different melt formed polypropylene homopolymers detailed in Table 1 below. The reinforcement type indicates the type of fibre from which the fabric is woven.

TABLE 1

| | Polymer No. | | | |
| --- | --- | --- | --- | --- |
| | 1 | 2 | | |
| Reinforcement type | Multifilament bundles | Fibrillated tape | 3 Flat tape | 4 Flat tape |
| Young's modulus E(GPa) | 9.5 | 10.9 | 6.2 | 6.8 |
| Failure strength $\sigma_F$ (MPa) | 453 | 350 | 370 | 422 |
| Failure strain $\epsilon_F$(%) | 12 | 6 | 16 | 16 |
| Density $\rho$ (kg/m³) | 907 | 912 | 932 | 910 |

TABLE 1-continued

|  | Polymer No. | | | |
|---|---|---|---|---|
| Reinforcement type | 1 Multifilament bundles | 2 Fibrillated tape | 3 Flat tape | 4 Flat tape |
| $M_n$ | 38,500 | 55,800 | 56,100 | 78,100 |
| $M_w$ | 191,000 | 290,000 | 325,000 | 360,000 |

$M_w$ and $M_n$ were measured by Rapra Technology Limited, of Shropshire, UK. Details of the testing are as follows:

| Instrument | Waters 150CV |
|---|---|
| Columns | Plgel 2 × mixed bed-B, 30cn 10 microns |
| Solvent | 1,2-dichlorobenzene with anti-oxidant |
| Flow-rate | 1.0 ml/min (nominal) |
| Temperature | 140° C. (nominal) |
| Detector | refractive index and differential pressure |
| GPC system calibrated with polystyrene | |

Woven cloths made of each of the above polymers were completely melted by heating two layers of cloth in a hot press at 200° C. The pressure applied was 2.8 MPa, although since the samples were completely melted this was not critical. Cooling was achieved either by removing the sample and plunging it into water (quenching) or in the hot press by passing a coolant through the heated platens, after switching off the heating. Depending on the rate of cooling required 100% water, or air containing water droplets, was used as the coolant. In this example fast cooling in the press means a cooling rate of 20-30° C./min. The slowest cooling rate, 1-2° C./min, was achieved by just switching off the heating and allowing the assembly to cool naturally in air.

Samples which were cooled in the press were removed from the press when the temperature had dropped to 100° C., which is 20° C. below the crystallisation temperature measured by DSC. The cooling rate is therefore determined by the time taken to cool from the compaction temperature down to 100° C.

Physical Properties
Mechanical Properties

The stress/strain behaviour of the above cooled films was measured using an RDP Howden servo-mechanical tensile testing machine. The tensile tests on the compacted sheets and the melted films were carried out following ASTM D638 using a dumbbell shaped specimen. A nominal strain rate of $10^{-3}$ s$^{-1}$ was used for all the tests. The sample strain during the tests was measured using a Messphysik video extensometer. Five samples were tested for each material at a temperature of 20±2° C. and a relative humidity of 35±5%.

Typical stress-strain curves are shown in FIG. 1, for each of the four polymer tests. The results show that for all four polymers, the quenched samples were ductile and drew in a stable manner with the formation of a stable neck region. Strain for these samples was measured from the crosshead speed, rather than directly on the sample, for if the neck formed outside the measured region, the strain in the measurement region actually decreased. The traces for the cooled and quenched samples have been displaced a small way along the x-axis simply in order to display each trace clearly.

For the sample made using fast cooling differences in behaviour were seen. The lowest molecular weight polymer (Polymer 1, Graph 1) showed an initial linear region, with an increased slope compared to the quenched sample—indicating higher Young's modulus—then a yield point, again higher than the quenched sample, then rupture after 7-8% of elongation. This form of stress-strain behaviour is often termed necking-rupture. Two intermediate molecular weight samples (Polymers 2 and 3, Graphs 2 and 3) showed the formation of a neck but drawing did not stabilise and rupture occurred at ~25% (0.25) strain. Only the highest molecular weight Polymer 4 (Graph 4) showed stable drawing following application of the fast cooling rate.

All the samples made by slow cooling showed necking-rupture or brittle behaviour. The failure strains of the original fibres were mostly between 10 and 20% (0.1 and 0.2): therefore if the matrix fails below this value then a hot compacted composite would see premature matrix failure before the reinforcing phase can reach full load carrying capacity, leading to premature delamination. It is seen that at the slowest cooling rate, none of the polymers reached this desired failure strain. In particular, the low molecular weight Polymer 1 showed brittle failure at a low stress.

It is clear that the cooling rate of the hot compaction process is a key process parameter, because it has a significant effect on the mechanical properties of the matrix phase, probably due to changes in crystallinity. The above results show that both quenching and fast cooling enhanced matrix ductility. As explained above, the greater the ductility of the matrix phase (and therefore the higher its failure strain) the better, in many situations, especially those in which the properties of hot compacted sheet are dominated by the matrix phase. These include interlayer adhesion (or peel strength) which depends mainly on the properties of the matrix, thermoformability where significant interlayer shear occurs (differential sliding between the layers), and normal tensile properties.

Density

The densities of the original oriented materials and the compacted sheets were measured using a density column. The column was made from a mixture of digycidyl ether and isopropanol to give a density range of ~890 to ~930 kg/m$^3$. The results are shown in Table 2.

TABLE 2

| Polymer | Material and cooling regime | Density (kg/m$^3$) |
|---|---|---|
| 1 | Original fibres | 907 |
|  | Melted film - quenching | 911 |
|  | Melted film - slow cooling | 915 |
| 2 | Original fibres - (cloth D) | 912 |
|  | Melted film - quenching | 920 |
|  | Melted film - slow cooling | 924 |
| 3 | Original tapes (cloth E) | 910 |
|  | Melted film - quenching | 920 |
|  | Melted film - slow cooling | 925 |

Modulus

The Young's Modulus was determined in the initial linear region of the stress strain curve following the guidelines of ASTM D638. The results are shown in Table 3 below.

TABLE 3

| | Young's modulus E (GPa) | | |
|---|---|---|---|
| Polymer | Quenching | Fast cooling | Slow cooling |
| 1 | 1.04 ± 0.02 | 1.85 ± 0.05 | 2.08 ± 0.13 |
| 2 | 1.00 ± 0.03 | 1.58 ± 0.06 | 1.71 ± 0.11 |
| 3 | 1.00 ± 0.09 | 1.24 ± 0.09 | 1.33 ± 0.01 |
| 4 | 0.95 ± 0.06 | 1.22 ± 0.10 | 1.37 ± 0.08 |

Tables 2 and 3 show the density and Young's modulus of the various melted films. Both of these properties can be used as a measure of the crystallinity of the films, as one can attribute increases in either parameter with an increase in crystallinity. As the cooling rate is increased, the density and Young's modulus for each polymer type decreases. The cause is believed to be a decrease in crystallinity. Another result is an improvement in ductility.

The present invention is of benefit in situations where improved ductility (or related properties such as peel strength) is required. It is of particular benefit for polymers of lower $M_w$, for example of $M_w$ 250,000 and below, since slow cooling regimes provide very brittle products, with such polymers.

EXAMPLE SET B

Peel Strength

Sheet samples were made using Polymer 1 cloths, and further sheet samples were made using Polymer 4 cloths. In each case the sheet samples were made of four layers of cloth, in a 0/90/90/0 lay-up (that is, the middle layers are orthogonal to the outer layers), and conditions were chosen to give a oriented fibre/matrix microstructure. In this way the central layers, where the peeling takes place, are in the same orientation, but overall the sheet samples have balanced properties.

Appropriate compaction conditions were chosen for the Polymer 1 and Polymer 4 samples. For Polymer 1 this was a compaction temperature of 182° C., a compaction pressure of 2.8 GPa, and a dwell time of 5 minutes. For Polymer 4 this was a compaction temperature of 192° C., a compaction pressure of 2.8 GPa, and a compaction dwell time of 5 minutes. Slow cooling was achieved by switching off the heating and allowing the heating platens, containing the sheet sample, to cool in air (1-2° C./min). Fast cooling (35° C./min in this example) was achieved by passing water through the heating platens.

The sheet samples were then tested for peel strength (interlayer adhesion). The test was the T-Peel test (ASTM D1876). Samples for testing were 10 mm wide and 100 mm long and were tested using a crosshead speed of 100 mm/min. The testing was carried out parallel to the warp direction. Three samples were tested for each polymer and the results were averaged.

The results are shown in Table 4 below.

TABLE 4

| Sample | Cooling regime | Average peel strength (N/10 mm) |
|---|---|---|
| Polymer 1 | Fast cooling | 2.75 ± 0.66 |
| | Slow cooling | 1.77 ± 0.32 |

TABLE 4-continued

| Sample | Cooling regime | Average peel strength (N/10 mm) |
|---|---|---|
| Polymer 4 | Fast cooling | 9.1 ± 2.2 |
| | Slow cooling | 9.5 ± 2.5 |

It will be seen that the peel strength values for Polymer 4 are, as expected, higher than the values for Polymer 1. The values for Polymer 4 are essentially the same for the fast and slow cooled samples. In contrast the fast cooled samples of Polymer 1 have a much higher peel strength value than the slow cooled samples.

The invention claimed is:

1. A process for production of a monolithic article from an assembly of two or more webs of fibres of oriented polypropylene homopolymer or copolymer having a melting temperature and a recrystallisation temperature and having a weight average molecular weight of less than or equal to 250,000, comprising the steps of:
   subjecting the assembly to elevated temperature and pressure sufficient to melt a proportion of the polymer and compact it; and
   actively cooling the compacted assembly at an elevated pressure to a predetermined amount below the recrystallisation temperature, wherein an accelerated rate of cooling is employed down to the predetermined amount below the recrystallisation temperature of the fibres at an accelerated cooling rate of at least 35° C. per minute, such as to produce a monolithic article with improved ductility and improved peel strength.

2. A process for the production of a monolithic article from an assembly of two or more webs of fibres of oriented polypropylene homopolymer or copolymer having a weight average molecular weight of less than or equal to 250,000, comprising the steps of subjecting the assembly to elevated temperature and pressure sufficient to melt a proportion of the polymer and compact it, and then actively cooling the compacted assembly at an elevated pressure, wherein an accelerated rate of cooling of at least 35° C. per minute is employed down to 100° C., such as to produce a monolithic article with improved ductility and improved peel strength.

3. A process as claimed in claim 1 wherein the compaction pressure does not exceed 10 MPa.

4. A process as claimed in claim 1, wherein the fibres are melt formed fibres.

5. A process as claimed in claim 1 wherein the weight average molecular weight ($M_w$) of the fibres is in the range 100,000 to 250,000.

6. A process as claimed in claim 1 wherein the weight average molecular weight ($M_w$) of the fibres is in the range 150,000 to 220,000.

* * * * *